United States Patent

Georg

[15] 3,640,210
[45] Feb. 8, 1972

[54] MULTIPLE-SCREW FLY PRESS

[72] Inventor: Otto Georg, Ostatrasse 12, 5802 Breckerfeld, Germany

[22] Filed: July 18, 1969

[21] Appl. No.: 842,944

[52] U.S. Cl. .............................................. 100/53, 100/270
[51] Int. Cl. ..................................................... B30b 15/28
[58] Field of Search .................. 150/53, 258, 289, 290, 270, 150/271

[56] References Cited

FOREIGN PATENTS OR APPLICATIONS 46,615  3/1963  Poland ................................. 100/290

*Primary Examiner*—Billy J. Wilhite
*Attorney*—Owen, Wickersham & Erickson

[57] ABSTRACT

The fly press comprises a flywheel means and, in combination, at least two screws, connected to the flywheel means, ram drive means for at least one ram, and at least two nuts mounted in said ram and peripherally movable and axially immovable in said ram. Overload-preventing means are arranged between said nuts and said ram and are adapted to be nonresponsive to torques below a minimum torque between said nuts and ram, so that such torques will be fully transmitted, whereas the overload-preventing means are responsive to torques which are higher than the minimum torque so that such higher torques will not be transmitted.

12 Claims, 4 Drawing Figures

Inventor:

Otto Georg

MULTIPLE-SCREW FLY PRESS

BACKGROUND OF THE INVENTION

This invention relates to overload-preventing means for multiple-screw fly presses, particularly two- and four-screw fly presses. It is an object of the invention to prevent an overloading of each screw independently of the number of screws, which is larger than one.

In multiple-screw fly presses, this object cannot easily be accomplished because eccentrically applied loads cause forces of different magnitude to be applied to the various screws. For this reason, a single overload-preventing device, such as is used in single-screw fly presses, is not sufficient. For the reasons stated, the object might be accomplished if the nuts which during the upward and downward motion of the ram cooperate with the screws are not connected to the ram for rotation therewith but are rotatable relative thereto. This freedom of rotary movement must be limited, of course. This may be accomplished by the provision of a friction brake between the nut body and the press ram. Because a friction brake would be effective throughout the movement of the nut and because the nuts must be connected, for reasons which will be set forth hereinafter, the torque requirement will be increased where two screws are provided. No screw will resist such torque. Hence, the object can be accomplished only with shear pins. Whereas shear pins as such are not new, they have been adopted so far only in single-screw fly presses, in which these measures have involved no difficulty, of course. In multiple-screw fly presses, however, it is not sufficient to protect each screw but care must be taken that the release of the safety device for one screw will not cause the ram of the press to be canted because this would block the press.

SUMMARY OF THE INVENTION

To accomplish this additional object, the present invention couples together the nuts in the ram for joint rotation. This coupling may be effected according to this invention by various means, such as gears or other machine elements. Particularly suitable are lever systems, which comprise forks and dogs entering the spaces between the fork prongs, or camwheels or the like.

To avoid a unilateral overload, these measures may be supplemented in a further development of the invention. If the screws are interconnected, e.g., by gears, to move in parallel, the flywheels on one side will increase the forces exerted on the other side when a higher load is applied to one screw than to the other. Hence, the load on the screw is higher than that applied by its own flywheel, which is adjusted in view of the amount of work to be performed on that side. The overload-preventing device cannot respond, however, because it is firmly coupled to the corresponding devices of the other screws. These additional difficulties are overcome according to the invention if, in another development of the invention, a play of a few millimeters on both sides is provided between the elements which connect the nuts. This results in the possibility that the safety device of the side concerned responds first, that response is not hindered by said coupling, and the resistance of the safety member must be overcome, e.g., a shear pin must be sheared through, before the remaining energy is transmitted to the other screw or screws and the safety devices provided there respond thereafter. A small movement is sufficient to shear a shear pin. In view of the large ratio with which movement is transmitted to the screw in an axial direction, the play of some millimeters between the transmitting members corresponds to an axial displacement of only some tenths of a millimeter of the ram. This will prevent a blocking of the press.

BRIEF DESCRIPTION OF THE DRAWINGS

The accompanying drawing illustrates embodiments of the invention by way of example.

DESCRIPTION OF SOME PREFERRED EMBODIMENTS

Figure 1:
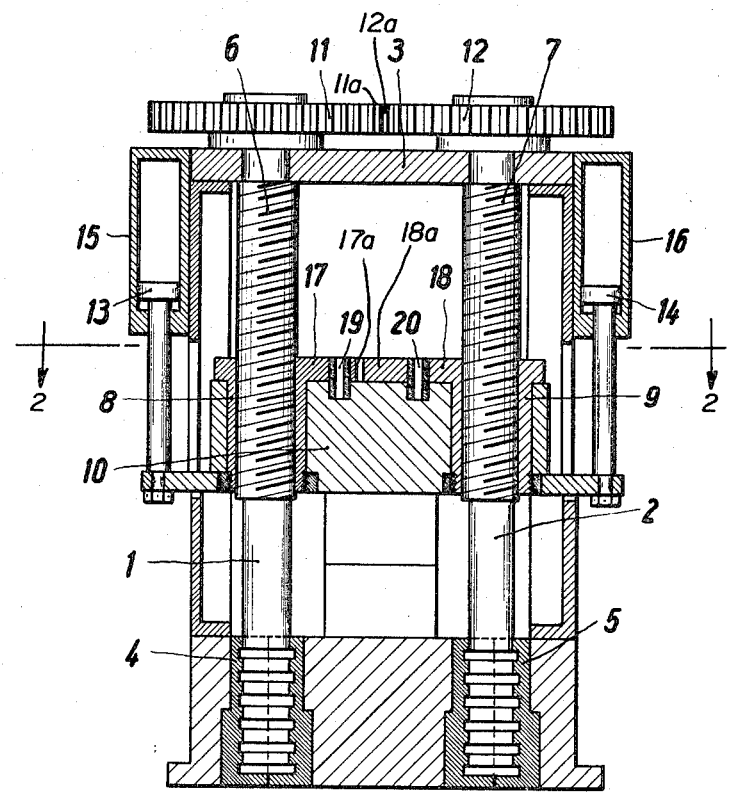
FIG. 1 is an elevation showing a two-screw fly press.

FIG. 1 shows two parallel screws 1, 2, which at their ends remote from the die are rotatably mounted in a bridge 3 and at their end facing the die are rotatably mounted in collar-oiled bearings 4, 5. At their ends remote from the die, the screws 1 and 2 are provided with respective oppositely handed, threaded portions 6 and 7 having coarse screw threads. The screws 1, 2 carry bronze nuts 8, 9 which engage in a ram 10 of the press. Rigid flywheels 11, 12 are carried by the screws at their ends and are provided at their peripheries with meshing gear rings 11a and 12a. The ram 10 of the press is driven by pressure fluids acting on pistons 13, 14 which are tightly guided in cylinders 15, 16.

The bronze nuts 8, 9 are rotatably mounted in the ram 10. Each of the nuts 8, 9 is formed at that end thereof which is remote from the die with flanges 17, 18 having leverlike extensions, 17a and 18a, the extension 17a comprising a fork and the extension 18a a dog, which lies in the space between the prongs of the fork. The levers 17a and 18a are protected from overload by shear pins 19, 20.

Figure 2:
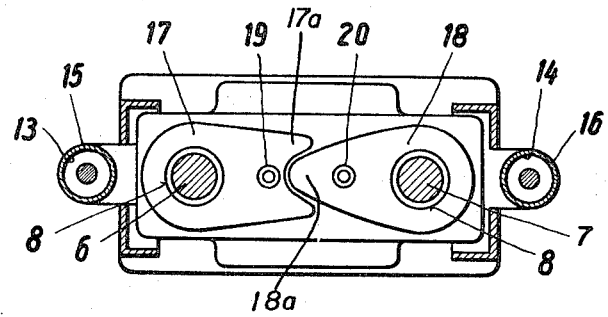
FIG. 2 is a transverse sectional view taken through the press above the overload-preventing means, along the line 2—2 in FIG. 1.

As is apparent from FIG. 2, there is a controlled, adjusted play of an order of some millimeters between the prongs of the forked lever 17a and the dog of the other lever 18a.

During normal operation, operation is the same as in conventional fly presses, the hydraulic cylinders 15 and 16 and their pistons 13 and 14 driving the ram 10 and thereby transmitting force through the screws 1 and 2 to the flywheels 11 and 12. However, overload stops normal operation of the press by breaking the shear pins 19 and 20 and enabling the nuts 8 and 9 to rotate in the ram 10. Note that, because of the interlock between the flanges 17 and 18, both shear pins 19 and 20 must shear in order to enable rotation of the nuts 8 and 9. This coupling together of the levers 17a and 18a insures that the release of the safety shear pin 19 for one screw 1 will not cause the ram 10 to be canted.

Figure 3:
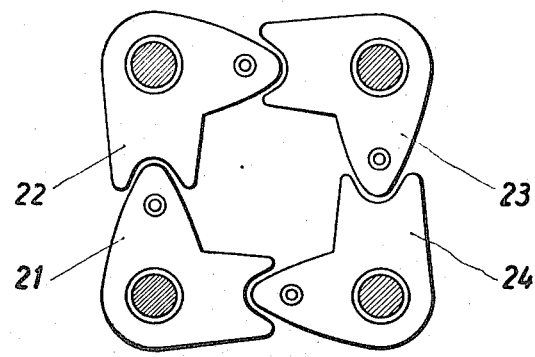
FIG. 3 shows a modified embodiment of the invention as applied to a four-screw fly press.

FIG. 3 shows how the invention is embodied in a four-screw fly press. The rotatable nuts 21, 22, 23 and 24 are also provided with shear pins and with leverlike extensions, which interengage as shown in FIG. 3. Each nut is thus coupled to the two adjacent nuts. There is in FIG. 3 and in FIGS. 1 and 2 a controlled play e.g., a few millimeters between the prongs of the forks and the dogs which extend between the prongs. Each of the nuts in FIG. 3 has again a safety shear pin as shown in FIG. 2.

Figure 4:
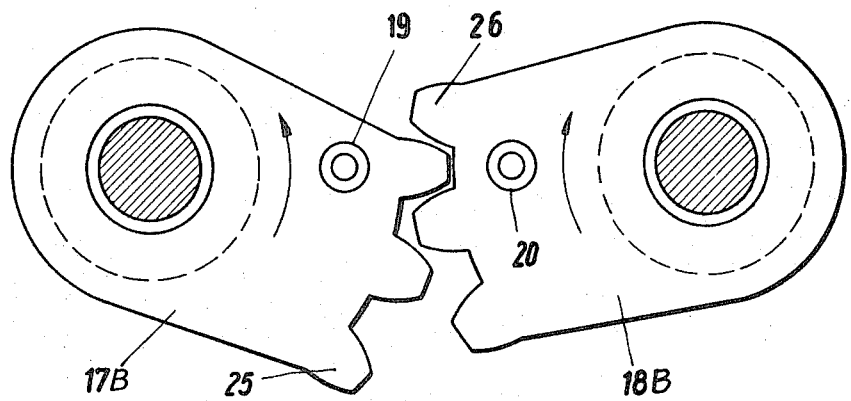
FIG. 4 shows a special embodiment of the invention.

When the shear pins have been sheared off, the two levers 17 and 18 may move pivotally outwardly so that they disengage. In that case it is difficult to move them back to their correct position. Besides, the press ram may become canted if the levers 17, 18 perform an outward pivotal movement through different angles. To avoid such effects, the levers may be provided with gear teeth, such as are shown at 25, 26 in FIG. 4. The levers 17B and 18B of FIG. 4 can perform an outward pivotal movement only through a relatively small angle because the movement takes place under pressure and the friction between the nuts and the ram will cause a dissipation of substantial energy. Hence, a few teeth are sufficient. In view of what has been said hereinbefore, the teeth must not be in tight mesh but must also have a play in both directions. The embodiment according to FIG. 4 has the advantage that the levers are returned to their initial position during the setting stroke, which is mechanically performed, and a new shear pin can be inserted. The device shown in FIG. 4 may be modified for use with four screws.

The invention provides very simple and effective overload-preventing means for multiscrew fly presses. It ensures that each screw will be subjected only to stresses up to the upper limit for which is is designed and that any canting or blocking of the ram of the press will be entirely avoided.

The invention resides also in individual ones of the features which have been described hereinbefore and relates to the combination of all these features and all combinations of some of these features, provided that the latter combinations are technically suitable and practicable and useful, even though the novel technical results which can be achieved have not been mentioned and have not been described in detail hereinbefore. All details shown in the drawing are considered as described as such and in their functional connection.

I claim:

1. In a fly press of the type having a ram, means for driving said ram, at least two threaded screws each having a flywheel, said flywheels being interengaged, and at least two internally threaded sleeves, one for each said screw and threadedly engaged therewith, each said sleeve being mounted in said ram, the combination therewith of
    overload-preventing means for normally preventing, at conditions below overload, substantial relative rotation between each said sleeve and said ram and shearing upon overload to enable such relative rotation, and
    interlock means for preventing such rotation, even upon overload at one said screw, until load conditions are reached causing shearing of all said overload-preventing means,
    whereby canting of the ram upon overload is prevented.

2. The device of claim 1 having means enabling a small play of said interlock means with each other before the load acting on one said screw is transmitted to the overload-preventing means of another said screw.

3. A fly press, comprising:
    at least one ram,
    ram drive means,
    a plurality of nuts rotatably mounted in said ram and having interior threads,
    a screw for each said nut and threadedly engaging said nut, and
    a flywheel secured to each said screw, said flywheels being interengaged, and
    overload-preventing means locking each said nut to said ram to transmit torque fully until a predetermined torque is reached between said nut and said ram, said overload-preventing means acting above said predetermined torque to prevent transmission of said torque from said nut to said ram.

4. The fly press of claim 3 wherein said overload-preventing means comprises shear pins connecting each said nut to said ram preventing relative rotation.

5. The fly press of claim 3 having coupling means between the nuts to prevent one nut from turning relative to said ram unless all such nuts are free to turn.

6. The fly press of claim 5 in which said coupling means comprises a flange on each of said nuts and means to interlock said flanges.

7. A fly press, comprising:
    at least one ram having a plurality of nuts rotatably mounted therein,
    ram drive means for said ram,
    a screw threadably engaging each said nut, each screw being connected to flywheel means, and
    overload-preventing means arranged between said nuts and said ram and nonresponsive to torques below a predetermined value between said nuts and said ram, so that torques below said predetermined value are fully transmitted, said overload-preventing means being responsive to torques above said predetermined value so as not to transmit them, said overload-preventing means including coupling means for transmitting peripheral movement from any one said nut to another said nut.

8. The fly press of claim 7 wherein said coupling means have play between them to transmit said peripheral movement from any one said nut only after the overload-preventing means for that nut has responded to a torque above said predetermined value.

9. The fly press of claim 8 wherein said play is of an order of a few millimeters.

10. The fly press of claim 7 wherein said coupling means include flanges on said nuts having gear teeth meshing with gear teeth on another said flange of a said nut.

11. The fly press of claim 7 wherein said overload-preventing means comprises a shear pin between each nut and said ram.

12. The fly press of claim 7 wherein there are four nuts and four screws, each said nut being joined by said coupling means to two other said nuts.

* * * * *